United States Patent
Donaldson et al.

(10) Patent No.: US 7,103,257 B2
(45) Date of Patent: Sep. 5, 2006

(54) HERMETICALLY SEALED FIBER TAIL ASSEMBLY FOR POLARIZATION MAINTAINING FIBER

(75) Inventors: Alan Donaldson, Clarksville, MD (US); Yu Yan, Jessup, MD (US)

(73) Assignee: Codeon Corporation, Columbia, MD (US)

( * ) Notice: Subject to any disclaimer, the term of this patent is extended or adjusted under 35 U.S.C. 154(b) by 569 days.

(21) Appl. No.: 10/083,464

(22) Filed: Feb. 27, 2002

(65) Prior Publication Data

US 2002/0122653 A1 Sep. 5, 2002

Related U.S. Application Data

(60) Provisional application No. 60/271,437, filed on Feb. 27, 2001.

(51) Int. Cl.
*G02B 6/00* (2006.01)

(52) U.S. Cl. .................................................. 385/138
(58) Field of Classification Search ................ 385/138, 385/76–78, 80–81, 86–87, 99, 12, 60
See application file for complete search history.

(56) References Cited

U.S. PATENT DOCUMENTS

| 4,166,672 | A | * | 9/1979  | Gilbert         | 385/60  |
| 4,330,171 | A | * | 5/1982  | Malsot et al.   | 385/80  |
| 4,362,356 | A | * | 12/1982 | Williams et al. | 365/80  |
| 4,440,469 | A | * | 4/1984  | Schumacher      | 385/81  |
| 4,729,624 | A | * | 3/1988  | Kakii et al.    | 385/78  |
| 4,773,725 | A | * | 9/1988  | Ashman et al.   | 385/87  |
| 4,994,134 | A | * | 2/1991  | Knecht et al.   | 156/294 |
| 5,222,176 | A | * | 6/1993  | Webber et al.   | 385/99  |
| 5,355,423 | A | * | 10/1994 | Phillips        | 385/12  |
| 5,664,043 | A |   | 9/1997  | Donaldson et al.| 385/138 |

FOREIGN PATENT DOCUMENTS

| DE | 35 33 920 A1 | 3/1987 |
| EP | 0 100 086 A2 | 2/1984 |
| EP | 0 608 895 A1 | 8/1994 |

OTHER PUBLICATIONS

"Electroless Plating of Optical Fibers for Hermetic Feedthrough Seals" by James E. Watson, et al., Sep. 2000, Electronic Components and Technology Conference.

* cited by examiner

*Primary Examiner*—J. F. Duverne
(74) *Attorney, Agent, or Firm*—Morgan Lewis & Bockius LLP

(57) ABSTRACT

A fiber tail assembly is provided that includes an outer sleeve, which can be attached and hermetically sealed to the housing of an optical device, and a sealing ferrule, which may be inserted into and hermetically sealed to the outer sleeve. An optical fiber may be inserted through an axial bore in the sealing ferrule and hermetically sealed thereto, such as with a glass seal. The hermetic seal between the sealing ferrule and the fiber avoids high or transversely asymmetric stress that may change the birefringence of the fiber. The optical fiber may be inserted through a cap ferrule or a stress relief tube, which may be attached to the fiber and to the outer sleeve, protecting the fiber tail assembly from axial stress that may damage the fiber or the hermetic seals. Methods for forming the same are provided.

22 Claims, 8 Drawing Sheets

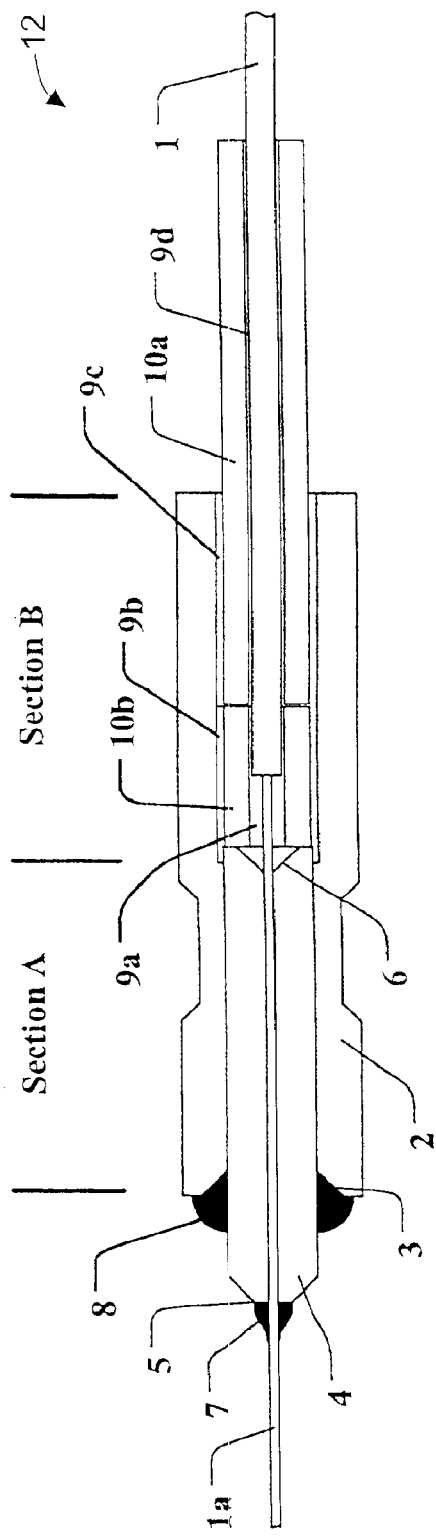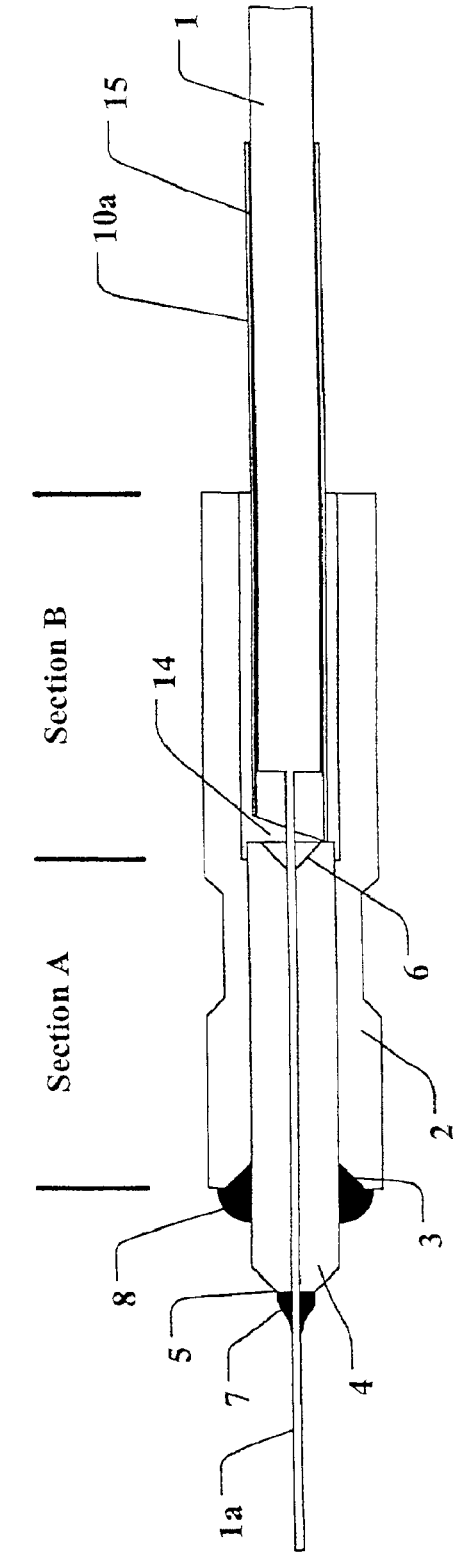

HERMETICALLY SEALED FIBER TAIL ASSEMBLY FOR POLARIZATION MAINTAINING FIBER

This application claims priority of now abandoned provisional application(s) No. 60/271,437 filed on Feb. 27, 2001.

BACKGROUND OF THE INVENTION

The present invention relates to the mechanical and optical connection of optical fibers within an optical system, and more particularly, to a hermetically sealed fiber tail assembly for connecting optical fibers to an optical device Optical fiber networks provide high-capacity communications with increased reliability at greatly reduced costs. Such networks often include components that are both sensitive to environmental conditions and installed in harsh environments. Further improvement in the reliability and cost of communications requires protection of optical components from such environments.

In an optical network, optical fibers are typically connected to optical components such as signal transmitters, modulators, signal testers, switches, fiber splices, signal splitters, amplifiers, or receivers. A fiber tail assembly ("FTA") may be placed on the optical fiber and the optical component to facilitate mechanical and optical coupling between the two. Optical components may be hermetically sealed in a device housing to prevent the device's being damaged by seepage of external elements into the package. However, in order to maintain a hermetic seal and protection of an optical component, the FTA must also be hermetically sealed to the fiber and to the component.

A component may be hermetically sealed to an optical fiber by metalizing the fiber and soldering a component to the metalized fiber surface. However, fiber metalization can reduce the strength of the glass fiber by introducing high surface stress, usually from slippage and/or metal spiking in the first adhesion layer that contacts the glass surface. Therefore, metalized fibers can be weak and break during assembly or, worse yet, while operating in the field.

Fiber metalization can also induce stress in the fiber that is not symmetric about the fiber axis. Such asymmetric stress can produce an asymmetric change in the fiber's refractive index that degrades the performance of polarization maintaining fiber ("PMF") by reducing its ability to maintain the polarization state of light that it carries. Furthermore, if melting temperatures of the metalization layer and the hermetic seal of the FTA are not sufficiently high, then the fiber metalization or the hermetic seal may be destroyed when the FTA is sealed to an optical component.

Thus, there is a need for an FTA that can be hermetically sealed to an optical fiber and to an optical component reliably and without damaging the mechanical or optical properties of the fiber.

SUMMARY OF THE INVENTION

The present invention provides a hermetically sealed fiber tail assembly that prevents weakening or breaking of the optical fiber. The fiber tail assembly protects the fiber from tensile or compressive axial stress. The fiber tail assembly exerts only a low and symmetric transverse stress on the fiber, thereby avoiding changes in the fiber's birefringence or optical polarization properties, such as a polarization maintaining fiber's ability to maintain the polarization state of light it carries. The present invention includes an outer sleeve that may be hermetically sealed to an optical device; a sealing ferrule interior to the outer sleeve that holds the fiber; hermetic seals between the fiber, the sealing ferrule and the outer sleeve; and fiber stress relief. The present invention also provides methods for forming the same.

The foregoing general description and the following detailed description are merely exemplary and explanatory and are not restrictive of the invention as claimed.

BRIEF DESCRIPTION OF THE DRAWINGS

The accompanying drawings, which are incorporated in and constitute a part of this specification, illustrate exemplary embodiments of the invention and, together with the description, serve to explain the principles of the invention. In the drawings:

FIG. 1 illustrates an exemplary fiber tail assembly that includes an outer sleeve, a sealing ferrule that is hermetically sealed to the outer sleeve and to an optical fiber, and a stress relief tube, in accordance with the present invention.

FIG. 2 illustrates an alternative exemplary embodiment of fiber tail assembly, like that of FIG. 1, that also includes a spacer tube between the sealing ferrule and the stress relief tube in accordance with the present invention.

In the drawings, where the different embodiments have similar structures, the same reference numbers are usually used.

DETAILED DESCRIPTION OF THE INVENTION

Figure 3:
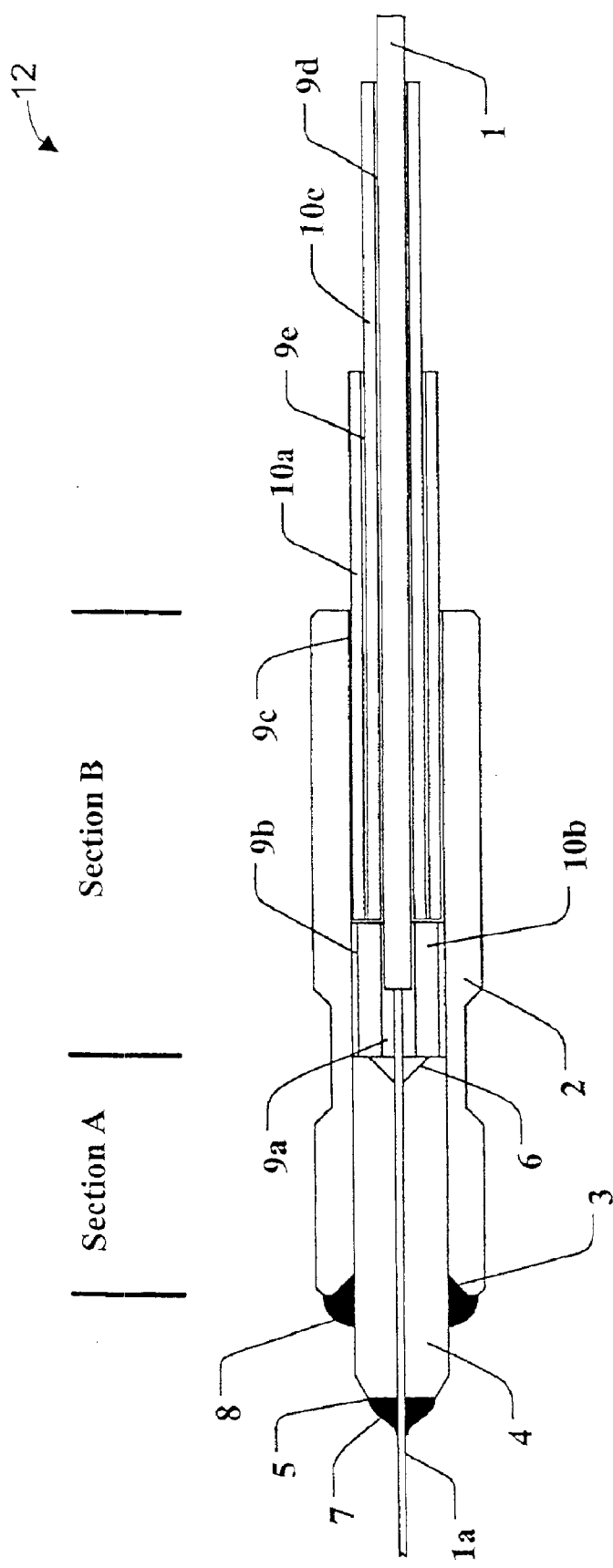
FIG. 3 illustrates an alternative exemplary embodiment of fiber tail assembly, like that of FIG. 2, that includes two stress relief tubes in accordance with the present invention.

Reference will now be made in detail to the present exemplary embodiments of the invention illustrated in the accompanying drawings. Whenever possible, the same reference numbers will be used throughout the drawings to refer to the same or like parts.

The present invention is particularly useful in the connection of optical fibers to optical components in optical communications networks. FIG. 1 illustrates an exemplary fiber tail assembly 12 that includes an outer sleeve 2 with a front Section A and a back Section B. Fiber tail assembly 12 may hold and be hermetically sealed to an optical fiber 1. A part of Section A may be inserted into an optical device's housing, attached thereto, and hermetically sealed to the housing, with optical fiber 1 fed through the optical device housing.

More specifically, Section A may be attached and hermetically sealed to the housing of an optical device through any convenient means, for example, through solder, adhesive, or mechanical fastening means such as a line nut with an O-ring. Outer sleeve 2 may include any material convenient to hermetically sealing, such as metal, metal alloy, glass, ceramic or metalized ceramic. For example, outer sleeve 2 can be comprised of a low-expansion alloy such as KOVAR or other material that can be soldered to the housing using a lead-tin solder or other low temperature solder.

Outer sleeve 2 includes an axial bore with a front bore diameter, a back bore diameter, and a front face. The front bore diameter extends substantially through Section A, and the back bore diameter extends substantially through Section B. The front and back bore diameters may be different, and the bore at the front face may be broadened to provide a ferrule-receiving recess 3.

Fiber tail assembly 12 includes a sealing ferrule 4 that extends from the interior of outer sleeve 2 in Section A, through recess 3, and protrudes through the front end of outer sleeve 2. The outer-diameter of sealing ferrule 4 may be of any size that facilitates insertion into outer sleeve 2, such as 1.25 mm, 1.44 mm, or any size slightly smaller than the front inner-diameter of outer sleeve 2. Recess 3 may be of any shape convenient to inserting a ferrule therein, such as a flare of the inner-diameter, a counter-sink, or a rounded surface.

This exemplary sealing ferrule 4 includes a substantially flat surface 5 at its front end, a bore through its length, and a fiber-receiving recess 6 in the bore at its back end. The sealing ferrule bore may have any inner-diameter convenient to receiving an optical fiber that has been stripped of its outside buffer to its cladding, such as a bore diameter of 300 μm. Recess 6 may be of any shape convenient to inserting an optical fiber into the bore, such as a flare of inner-diameter, a counter-sink, or a rounded surface. Sealing ferrule 4 may comprise any material convenient to holding an optical fiber and being hermetically sealed, such as metal, glass, or ceramic.

Fiber tail assembly 12 may hold an optical fiber 1 that has a stripped section 1a at its front end, which has its outside buffer layer removed to expose its cladding layer. Optical fiber 1 may be inserted into fiber tail assembly 12 so that stripped section 1a extends through sealing ferrule 4 and protrudes from the front of sealing ferrule 4 and into Section B. Stripped section 1a is hermetically sealed to sealing ferrule 4 at flat surface 5 by a fiber seal 7 that is placed so as to contact and adhere to stripped section 1a and sealing ferrule 4. Furthermore, sealing ferrule 4 is hermetically sealed to outer sleeve 2 by a ferrule seal 8 that is placed substantially within ferrule receiving recess 3 so as to contact and adhere to sealing ferrule 4 and outer sleeve 2. Seals 7 and 8 are comprised of any material convenient to forming hermetic seals, such as solder or glass.

Fiber seal 7 may be comprised of a material that flows at a lower temperature than does ferrule seal 8 so that fiber seal 7 may be installed after ferrule seal 8 without disturbing ferrule seal 8. Likewise, the material that attaches and hermetically seals outer sleeve 2 to the optical device housing may have a lower flow-temperature than that of fiber seal 7 so that fiber tail assembly 12 may be sealed to the housing, without disturbing any existing hermetic seals of the assembly. For example, ferrule seal 8 may be a solder that melts at over 600 degrees Celsius (e.g., Cu/Ag solder); fiber seal 7 may be a glass frit preform, with a minimum of binder, that has a melting point below 600 degrees Celsius, and the seal to the optical device housing may be a lead/tin solder compound having a melting point below that of the glass frit.

As an example, sealing ferrule 4 may be comprised of cubic zirconia, and outer sleeve 2 may be comprised of a low-expansion alloy, such as KOVAR. In this example, the cubic zirconia of sealing ferrule 4 may be sealed to both stripped section 1a and outer sleeve 2. Additionally, with the thermal expansion of cubic zirconia closely matching that of KOVAR, outer sleeve 2 and sealing ferrule 4 expand at substantially the same rate, thereby reducing material stress in both.

Any pushing or pulling of optical fiber 1 along its axis may degrade or break the hermetic seal of fiber seal 7, or may damage or induce axial stress in stripped section 1a. Stress relief may prevent such damage and axial stress. Fiber tail assembly 12 includes a stress relief tube 10a that extends from inside Section B of outer sleeve 2 to protrude through the back of outer sleeve 2. Optical fiber 1 passes through stress relief tube 10 and includes a length of stripped section 1a, protruding into Section B and extending through Section A, and a length of unstripped optical fiber 1, extending from Section B and continuing through the back of Section B, as described above. An adhesive 14 adheres fiber receiving recess 6 to the length of stripped section 1a that extends into Section B, the outer surface of stress relief tube 13 and the inner surface of outer sleeve 2. Also, an adhesive 15 adheres the inner surface of stress relief tube 10a to the buffer of optical fiber 1.

Stress relief tube 10a may include any material convenient to the formation of fiber tail assembly 12 and protection of optical fiber 1, such as polytetrafluoroethylene or other materials that will bond to adhesives. Adhesives 14 and 15 may be any adhesive that will adhere, as required, to ferrule 4, stress relief tube 13, optical fiber 1, and stripped section 1a. For example, the adhesives may be epoxy, or other materials, that will maintain a bond through the heating process of outer sleeve 2 being soldered to an optical device's housing. FIG. 1 illustrates a stress relief tube 10a with a diagonally cut end-face located inside Section B. However, the end-face of stress relief tube 10a may have any shape that is convenient to insertion into Section B and retention and stress relief of optical fiber 1, such as being cut diagonal or perpendicular to the axis of tube 10a or having an outer diameter taper. Fiber tail assembly 12 may hold any optical fiber 1 that is convenient for connection to optical components. For example, optical fiber 1 may be a single mode fiber, a polarization maintaining fiber, or a multimode fiber.

FIG. 2 illustrates another exemplary embodiment of fiber tail assembly 12 in accordance with the present invention. Fiber tail assembly 12 includes an outer sleeve 2 with a Section A and a Section B, a sealing ferrule 4, a ferrule seal 8, an optical fiber 1, a fiber seal 7, and a stress relief tube 10a, similar to fiber tail assembly 12 of FIG. 1. Furthermore, optical fiber 1 extends through fiber tail assembly, with stripped section 1a extending from Section B, through Section A, and through the front of sealing ferrule 4, like optical fiber 1 of FIG. 1.

In this exemplary embodiment, fiber tail assembly 12 also includes a spacer tube 10b that lies inside of outer sleeve 2, in Section B, between sealing ferrule 4 and stress relief tube 10a. Optical fiber 1 passes through outer sleeve 2, and stress relief tube 10a, with stripped section 1a passing through sealing ferrule 4 and part of spacer tube 10b. An adhesive 9a adheres fiber receiving recess 6, stripped section 1a, and a portion of unstripped optical fiber 1, similar to adhesive 14 of FIG. 1. An adhesive 9b adheres the outer surface of spacer tube 10b to the inner surface of outer sleeve 2. An adhesive 9c adheres the outer surface of stress relief tube 10a to the inner surface of outer sleeve 2, and an adhesive 9d adheres the inner surface of stress relief tube 10a to the buffer of optical fiber 1.

Stress relief tube 10a and spacer tube 10b may include any material convenient to the formation of fiber tail assembly 12 and protection of optical fiber 1, such as polytetrafluoroethylene or other materials that will bond to adhesives. Adhesives 9a–9d may be any adhesive that will adhere, as required, to ferrule 4, stress relief tube 10a, spacer tube 10b, optical fiber 1, and stripped section 1a. For example, the adhesives may be epoxy, or other materials, that will maintain a bond through the heating process of outer sleeve 2 being soldered to an optical device's housing.

In this exemplary embodiment, fiber tail assembly 12 may hold any optical fiber 1 that is convenient for connection to optical components. For example, optical fiber 1 may be a single mode fiber, a multimode fiber, or a polarization maintaining fiber (PMF) 11 with a section of stripped PMF 11a. However, if material from fiber seal 7 leaks into the clearance space between sealing ferrule 4 and a stripped PMF 11a, then the material can induce asymmetric stress in stripped PMF 11a that will effect its optical properties. Specifically, asymmetric stress may cause asymmetric changes to the fiber's index of refraction that may reduce the fiber's ability to maintain the optical polarization of the light it carries. This is especially a problem if fiber seal 7 is comprised of solder and sealing ferrule 4 is metal.

Therefore, an exemplary sealing ferrule 4 may instead be comprised of a nonmetal material, such as glass or cubic zirconia, with a smooth bore and a small clearance between sealing ferrule 4 and stripped PMF 11a that does not allow material of fiber seal 7 to leak into the clearance space. As a further example, adhesive 9a may be uniformly formed around the stripped PMF 11a as it runs from the buffer of PMF 11 into recess 6 of sealing ferrule 4. Therefore, radial stress on stripped PMF 11a may be kept low and uniform, without inducing asymmetric changes in refractive index or reducing the fiber's ability to maintain the polarization of light.

FIG. 3 illustrates another exemplary embodiment of fiber tail assembly 12 in accordance with the present invention. Fiber tail assembly 12 includes an outer sleeve 2 with a Section A and a Section B, a sealing ferrule 4, a ferrule seal 8, an optical fiber 1, a fiber seal 7, a first stress relief tube 10a, and a spacer tube 10b, similar to fiber tail assembly 12 of FIG. 2. Also, optical fiber 1 extends through fiber tail assembly, with a length of stripped section 1a, that extends from part of Section B, through Section A, and out through the front of sealing ferrule 4, like optical fiber 1 of FIG. 2.

In this exemplary embodiment, fiber tail assembly 12 includes a second stress relief tube 10c, that is similar to and lies inside first stress relief tube 10a, between first stress relief tube 10a and optical fiber 1. The front faces of first and second stress relief tubes 10a and 10c are located against the back face of spacer tube 10b. The back end of second stress relief tube 10c extends through and beyond the back end of first stress relief tube 10a. Adhesives 9a through 9c adhere fiber receiving recess 6, stripped section 1a, unstripped optical fiber 1, spacer tube 10b, first stress relief tube 10a, and outer sleeve 2, as in FIG. 2. An adhesive 9d adheres the inner surface of second stress relief tube 10c to the buffer of optical fiber 1, and an adhesive 9e adheres the inner surface of first stress relief tube 10a to the outer surface of second stress relief tube 10c. The adhesives, materials, bore smoothnesses and clearance spaces may be similar to those of fiber tail assembly 12 of FIG. 2.

Figure 4:
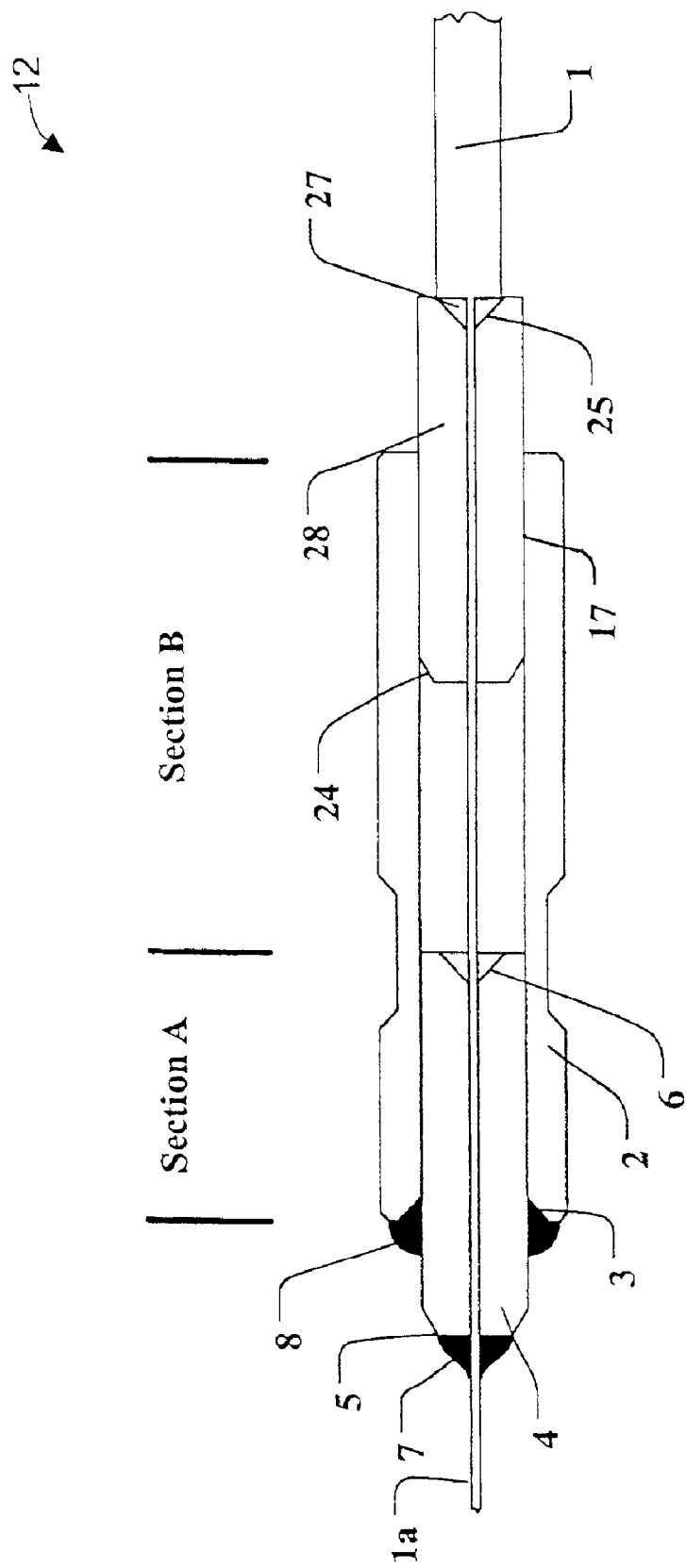
FIG. 4 illustrates an exemplary fiber tail assembly that includes a cap ferrule that is attached to the optical fiber and inserted into the outer sleeve in accordance with the present invention.

FIG. 4 illustrates another exemplary embodiment of fiber tail assembly 12 in accordance with the present invention. Fiber tail assembly 12 includes an outer sleeve 2 with a Section A and a Section B, a sealing ferrule 4, a ferrule seal 8, a fiber seal 7, and an optical fiber 1, with a stripped section 1a, similar to the fiber tail assembly 12 of FIG. 1. In this embodiment, fiber tail assembly 12 includes a cap ferrule 28 that has an inner bore, which extends through the length of cap ferrule 28. The bore diameter may be any size convenient to inserting stripped section 1a through the length of the bore, such as 300 μm or any size slightly larger than the outer diameter of stripped section 1a. The bore surface may be smooth and may include a fiber-receiving recess 25 at the back end of the bore, so as to facilitate insertion of stripped section 1a through cap ferrule 28. Recess 25 may be of any shape that facilitates inserting stripped section 1a into the bore, such as a flare of inner-diameter, a counter-sink, or a rounded surface. An adhesive 27 may adhere fiber-receiving recess 25 to unstripped optical fiber 1 and to stripped section 1a.

In this embodiment of fiber tail assembly 12, cap ferrule 28 lies inside the bore of outer sleeve 2 and protrudes through the back of Section B. Cap ferrule 28 may have any outer diameter that facilitates insertion into outer sleeve 2, such as 1.25 mm, 1.44 mm, or any size slightly smaller than the inner diameter of outer sleeve, Section B. Cap ferrule 28 may also include an insertion taper 24 of its outer diameter at its front end. Insertion taper 24 may have any shape that facilitates insertion of cap ferrule 16 into the bore of outer sleeve 2, such as a taper in outer-diameter, a flat cut-back, or a rounded surface. An adhesive 17 may adhere the outer surface of cap ferrule 28 to the inner surface of outer sleeve 2 in Section B. Fiber 1 may be inserted into and adhered to cap ferrule 28 prior to cap ferrule 28 being inserted into the back of Section B.

Cap ferrule 28 may include any material convenient to holding an optical fiber and being inserted into outer sleeve 2, such as metal, glass, or ceramic. For example, cap ferrule 28 may be comprised of cubic zirconia, and outer sleeve 2 may be comprised of a low-expansion alloy, such as KOVAR. In this example, with the thermal expansion of cubic zirconia closely matching that of KOVAR, outer sleeve 2 and sealing ferrule 4 may expand at substantially the same rate, thereby reducing material stress. Optical fiber 1 may be of any type that is convenient for connection to optical components. For example, optical fiber 1 may be a single mode fiber, a polarization maintaining fiber, a multimode fiber, or a polarization maintaining fiber (PMF) 11 with a section of stripped PMF 11a. Adhesives 17 and 27 may be any adhesives convenient to the assembly of fiber assembly 12, such as epoxy, or other materials, that will maintain a bond through the heating process of outer sleeve 2 being soldered to an optical device's housing.

Figure 5:
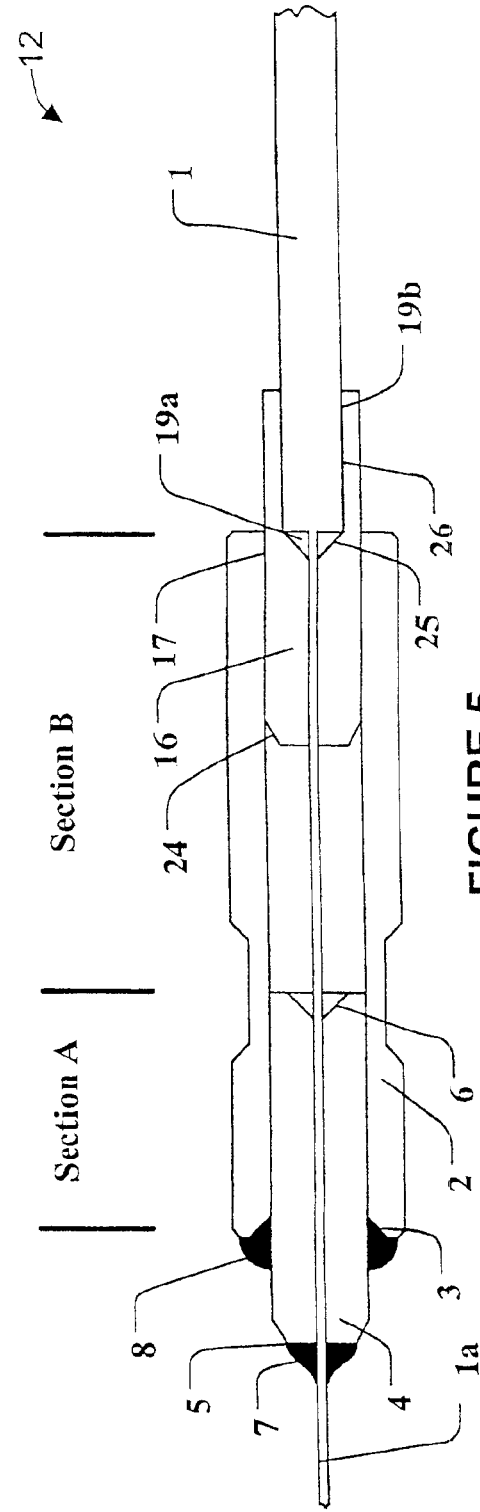
FIG. 5 illustrates an alternative exemplary fiber tail assembly that includes a cap ferrule that is attached to the optical fiber and inserted into the outer sleeve in accordance with the present invention.

FIG. 5 illustrates another exemplary embodiment of fiber tail assembly 12 in accordance with the present invention. Fiber tail assembly 12 includes an outer sleeve 2 with a Section A and a Section B, a sealing ferrule 4, a ferrule seal 8, an optical fiber 1, with a stripped section 1a, a fiber seal 7, and a cap ferrule 16, similar to the fiber tail assembly 12 of FIG. 4.

In this embodiment, cap ferrule 16 includes an inner bore with a front section, similar to that of cap ferrule 28 of FIG.

4, and a back section 26. Optical fiber 1 may extend through the bore with a length of unstripped optical fiber 1 fit into back section 26 and stripped section 1a extending through the front section. The bore diameters of the front section and back section 26 may be different and any size convenient to inserting optical fiber 1 through cap ferrule 16. For example, the inner diameter of back section 26 may be slightly larger than the outer diameter of unstripped optical fiber 1, and the inner diameter of the front section may be slightly larger than the outer diameter of stripped section 1a, such as a front bore diameter of 300 µm and a back bore diameter of 600 µm.

Fiber-receiving recess 25 may be similar to that of FIG. 4 except that it is located in the bore surface at the boundary between the front and back sections, so as to facilitate insertion of stripped section 1a through cap ferrule 16. An adhesive 19a may adhere fiber-receiving recess 25 to unstripped optical fiber 1 and to stripped section 1a, while another adhesive 19b adheres the inner surface of back section 26 to the outer surface of unstripped optical fiber 1.

In this embodiment of fiber tail assembly 12, cap ferrule 16 includes an insertion taper 24, lies inside the bore of outer sleeve 2, protrudes through the back of Section B, and is adhered to outer sleeve 2, similar to cap ferrule 28 of FIG. 4. Cap ferrule 16 may similarly include any material convenient to holding an optical fiber and being inserted into outer sleeve 2, such as metal, glass, ceramic, or cubic zirconia. Optical fiber 1 may similarly be of any type that is convenient for connection to optical components, such as a single mode fiber, a polarization maintaining fiber, or a multimode fiber. Adhesives 17, 19a and 19b may be any adhesive convenient to the assembly of fiber assembly 12, such as epoxy, or other materials, that will maintain a bond through the heating process of outer sleeve 2 being soldered to an optical device's housing.

Figure 6:
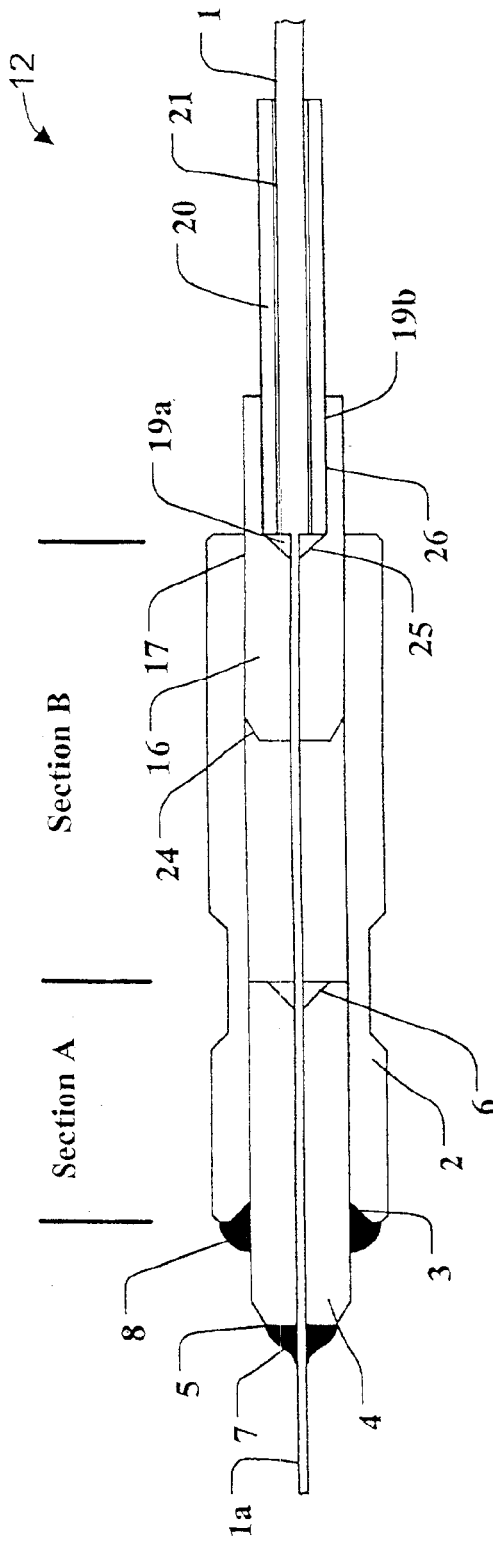
FIG. 6 illustrates an exemplary fiber tail assembly, like that of FIG. 5, that also includes a spacer tube in the cap ferrule, in accordance with the present invention.

FIG. 6 illustrates another exemplary embodiment of fiber tail assembly 12 in accordance with the present invention. Fiber tail assembly 12 includes an outer sleeve 2 with a Section A and a Section B, a sealing ferrule 4, a ferrule seal 8, a cap ferrule 16, an optical fiber 1, and a fiber seal 7, similar to fiber tail assembly 12 of FIG. 5. In this example, fiber tail assembly 12 also includes a spacer tube 20 that lies inside of and extends out of the back of back section 26 of cap ferrule 16. Optical fiber 1 passes through spacer tube 20, with stripped section 1a extending beyond spacer tube 20 through the front section of cap ferrule 16, through outer sleeve 2 and the front of sealing ferrule 4.

An adhesive 19a may adhere fiber-receiving recess 25 to unstripped optical fiber 1 and to stripped section 1a, while another adhesive 19b adheres the inner surface of back section 26 to the outer surface of spacer tube 20, and an adhesive 21 adheres the outer surface of unstripped optical fiber 1 to the inner surface of spacer tube 20. Adhesives 17, 19a, 19b and 21 may be any adhesive convenient to the assembly of fiber assembly 12, such as epoxy, or other materials, that will maintain a bond through the heating process of outer sleeve 2 being soldered to an optical device's housing.

Figure 7A:
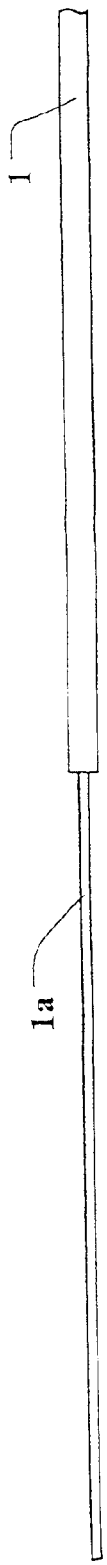
FIGS. 7a through 7e schematically show an exemplary method of forming the exemplary fiber tail assembly of FIG. 2, in accordance with the present invention.
Figure 7B:
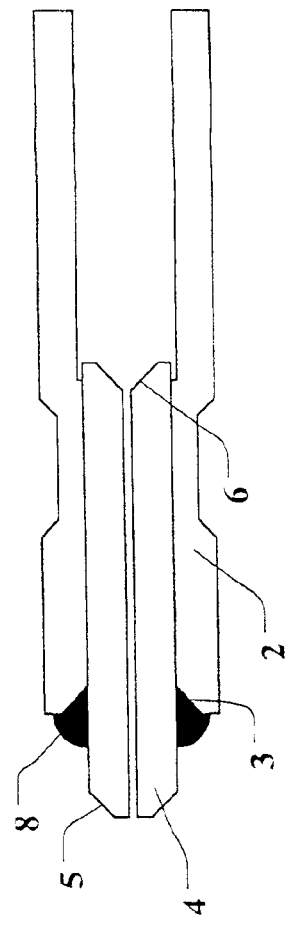

FIGS. 7a–7e illustrate an exemplary method for manufacturing the exemplary embodiment of the present invention shown in FIG. 2. FIG. 7a illustrates stripping a length of optical fiber 1 of its buffer layer to expose its cladding layer, providing stripped section 1a. FIG. 7b illustrates inserting sealing ferrule 4 into the bore of outer sleeve 2, so that sealing ferrule 4 is substantially in Section A and the front face of sealing ferrule 4 protrudes from the front end of outer sleeve 2. FIG. 7b also illustrates hermetically sealing outer sleeve 2 to sealing ferrule 4 through ferrule seal 8.

Figure 7C:
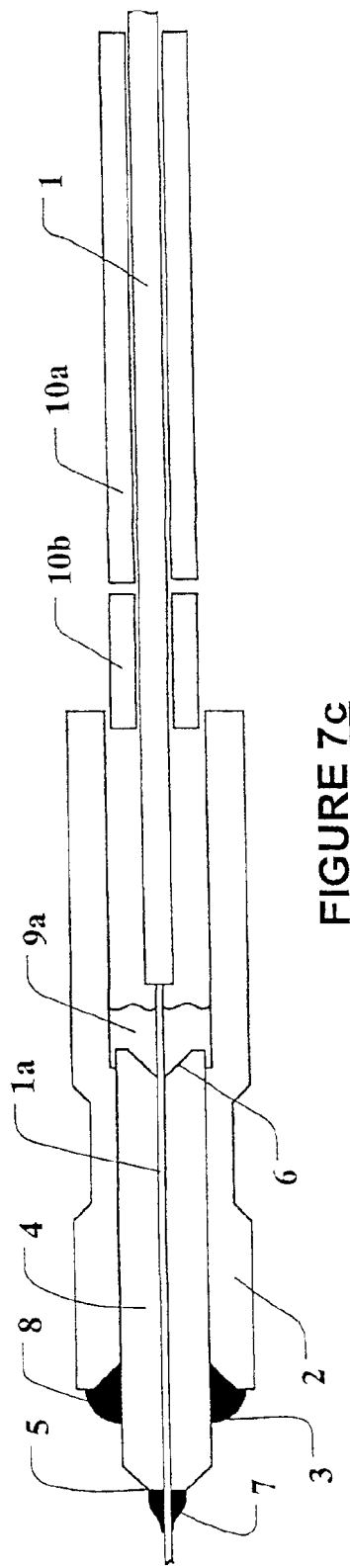

FIG. 7c illustrates inserting stripped section 1a and a length of unstripped optical fiber 1 through spacer tube 10b and stress relief tube 10a. FIG. 7c illustrates inserting the front end of stripped section 1a through outer sleeve 2 and sealing ferrule 4 so that the back end of stripped section 1a is less than the length of spacer tube 10b behind the back face of sealing ferrule 4 and hermetically sealing stripped section 1a to sealing ferrule 4 through fiber seal 7. FIG. 7c also illustrates inserting an amount of adhesive 9a into fiber-receiving recess 6 and Section B of outer sleeve 2.

Figure 7D:
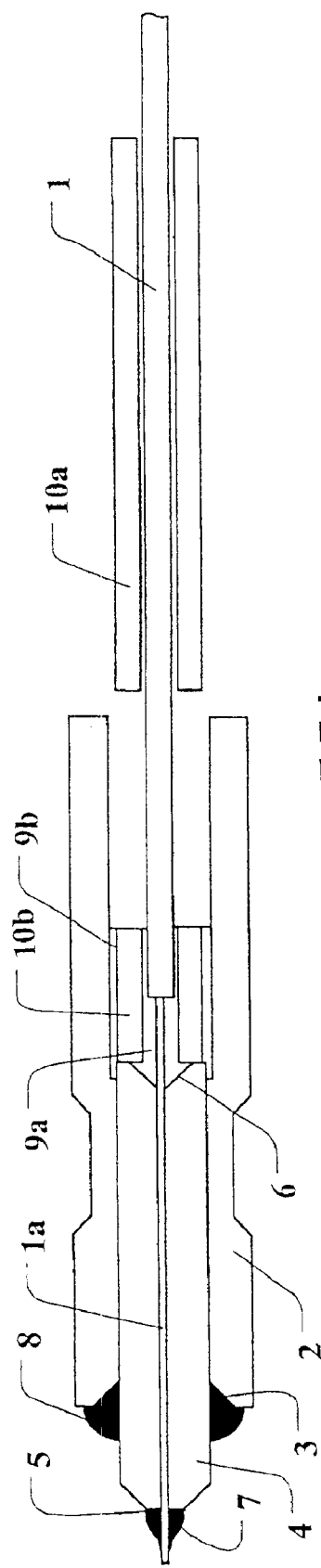

FIG. 7d illustrates sliding spacer tube 10b into outer sleeve 2, Section B, so that the front face of spacer tube 10b meets the back face of sealing ferrule 4, and so that fiber-receiving recess 6, stripped section 1a, unstripped optical fiber 1 and spacer tube 10b are adhered together. FIG. 7d also illustrates inserting adhesive 9b so as to adhere the outer surface of spacer tube 10b to the inner surface of outer sleeve 2.

Figure 7E:
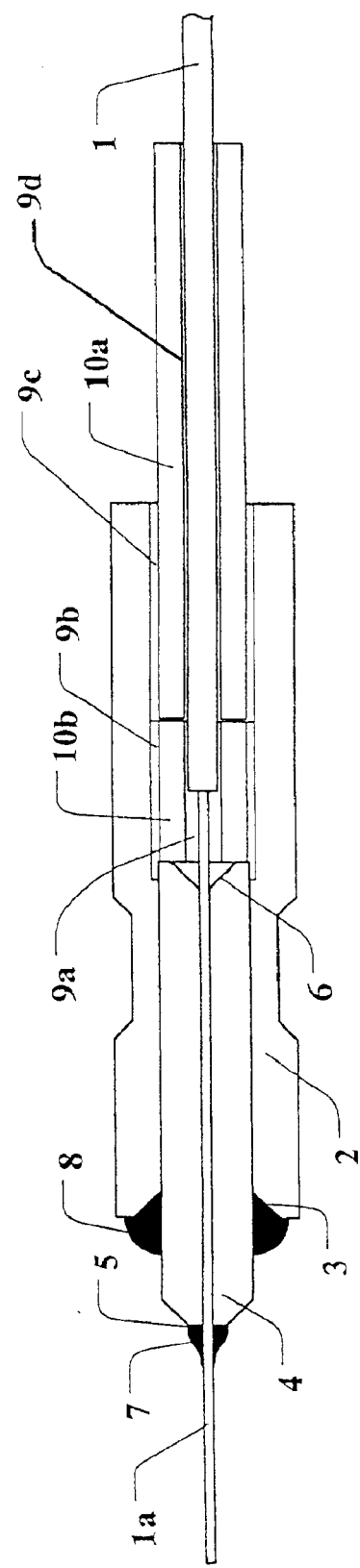

FIG. 7e illustrates sliding stress relief tube 10a into Section B so that its front face meets with the back face of spacer tube 10b, inserting adhesive 9c so as to adhere the inner surface of outer sleeve 2 to the outer surface of stress relief tube 10a, and inserting adhesive 9d so as to adhere the inner surface of stress relief tube 10a to the buffer of optical fiber 1.

Figure 8A:
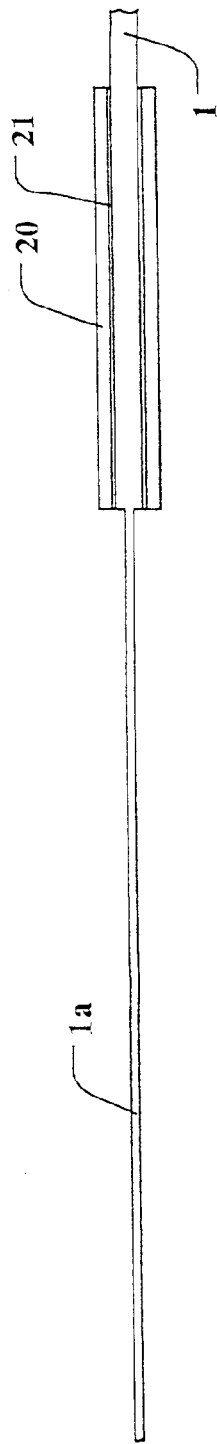
FIGS. 8a through 8e schematically show an exemplary method of forming the alternative exemplary fiber tail assembly of FIG. 6, in accordance with the present invention.
Figure 8B:
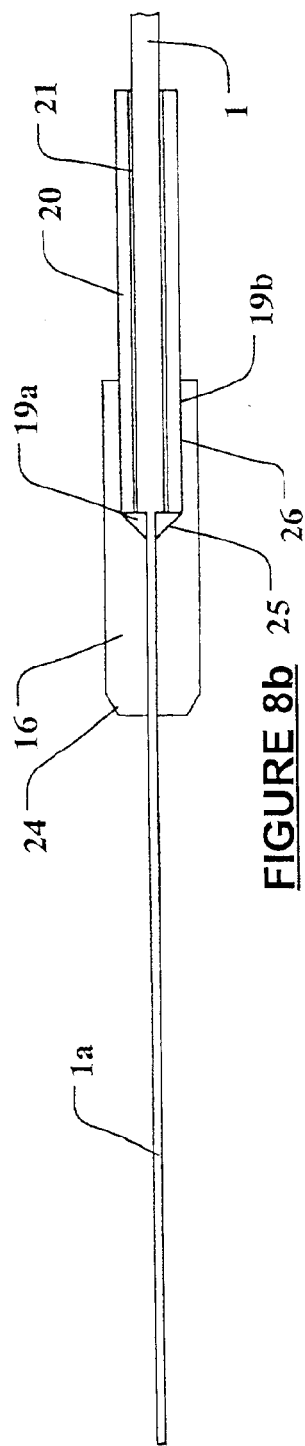

FIGS. 8a–8e illustrate an exemplary method for manufacturing the exemplary embodiment of the present invention shown in FIG. 6. FIG. 8a illustrates stripping a length of optical fiber 1 of its buffer layer to expose its cladding layer and provide stripped section 1a, inserting optical fiber 1 through spacer tube 20 so that the back end of stripped section 1a aligns with the front face of spacer tube 20, and inserting adhesive 21 so as to adhere the inner surface of spacer tube 20 to the buffer of optical fiber 1. FIG. 8b illustrates inserting adhesive 19a into fiber receiving recess 25, inserting stripped section 1a through the bore of cap ferrule 16. FIG. 8b also illustrates sliding the subassembly of FIG. 8a into back section 26 so that the front face of spacer tube 20 is located against fiber receiving recess 25 and the back end of spacer tube 20 protrudes out of the back end of cap ferrule 16, and inserting adhesive 19b so as to adhere the outer surface of spacer tube 20 to the inner surface of cap ferrule 16.

Figure 8C:
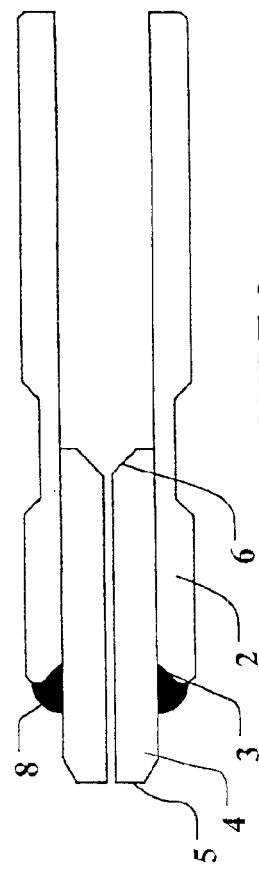
Figure 8D:
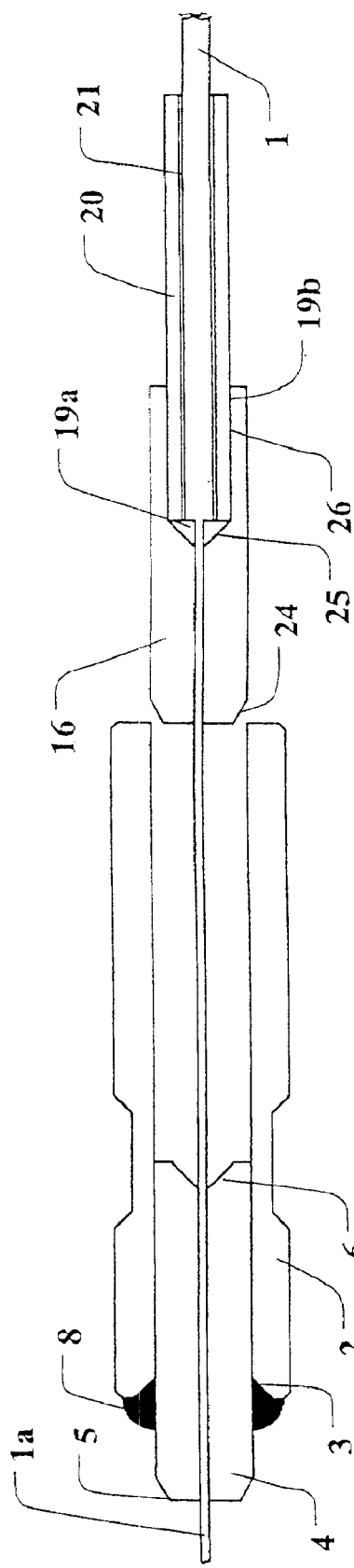
Figure 8E:
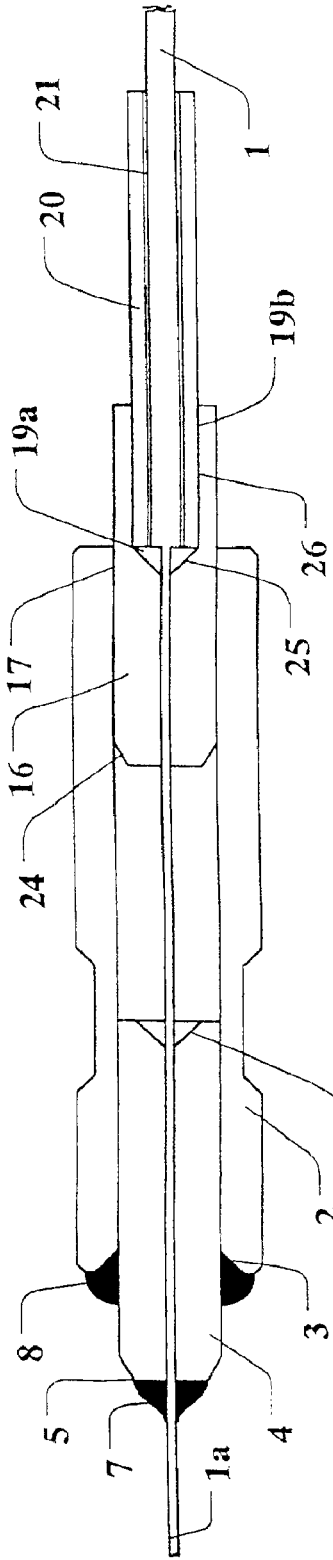

FIG. 8c illustrates inserting sealing ferrule 4 into the bore of outer sleeve 2, so that sealing ferrule 4 is substantially in Section A and the front face of sealing ferrule 4 protrudes from the front end of outer sleeve 2. FIG. 8c also illustrates hermetically sealing outer sleeve 2 to sealing ferrule 4 through ferrule seal 8. FIG. 8d illustrates inserting stripped section 1a through the bore of sealing ferrule 16 and inserting insertion taper 24, of the subassembly of FIG. 8b, into Section B of outer sleeve 2. FIG. 8e illustrates inserting the subassembly of FIG. 8b into the subassembly of FIG. 8c so that the front section of cap ferrule 16 is substantially within Section B and back section 26 of cap ferrule 16 protrudes out of the back of outer sleeve 2. FIG. 8e also illustrates inserting adhesive 17 so as to adhere the outer surface of cap ferrule 16 to the inner surface of outer sleeve 2, Section B.

As should be clear from the embodiments described above, the present invention provides structures and methods for forming a hermetically sealed connection between an optical fiber and an optical device.

Those skilled in the art will appreciate that various modifications can be made in the present invention without departing from the spirit or scope of the invention. The specification and examples are exemplary only, and the present invention includes modifications and variation thereof provided they come within the scope of the appended claims and their equivalents.

We claim:

1. A fiber tail assembly for connecting an optical fiber to an optical device, comprising:
    an outer sleeve having a front end for connection to an optical device and a back end;
    a sealing ferrule located in the outer sleeve, the sealing ferrule including a substantially axial bore;
    a ferrule seal for hermetically sealing the sealing ferrule to the outer sleeve;
    an optical fiber that extends from a back end of the sealing ferrule, through the bore, and protrudes out of a front end of the sealing ferrule;
    a fiber seal for hermetically sealing the optical fiber directly to the sealing ferrule; and a cap ferrule that has a front and back end and is located in the outer sleeve at the back end of the outer sleeve, the cap ferrule having a substantially axial bore, the optical fiber passing through the bore of the cap ferrule, and the cap ferrule, the outer sleeve, and the fiber being secured together.

2. The fiber tail assembly according to claim 1, further comprising a first stress relief tube located in the outer sleeve and having a back end that protrudes from the back end of the outer housing, the fiber passing through the first stress relief tube, and the first stress relief tube, the outer sleeve, and the fiber being secured together.

3. The fiber tail assembly according to claim 2, further comprising a spacer tube located in the outer sleeve between the sealing ferrule and the first stress relief tube, the fiber passing through the spacer tube, and the first stress relief tube, the spacer tube, the outer sleeve, and the fiber being secured together.

4. The fiber tail assembly according to claim 3, further comprising a second stress relief tube located in the first stress relief tube and protruding from the back end of the first stress relief tube, the fiber passing through the second stress relief tube, and the first stress relief tube, the second stress relief tube, the spacer tube, the outer sleeve, and the fiber being secured together.

5. The fiber tail assembly according to claim 1, further comprising:
    a length of optical fiber having a stripped length at a front end and an unstripped length behind, the stripped length being stripped of its buffer;
    a front section of the cap ferrule at its front end having a front bore diameter, the front bore diameter being sized to provide a sliding fit to the stripped length of optical fiber;
    a back section of the cap ferrule at its back end having a back bore diameter, the back bore diameter being sized to accommodate insertion of a part of the unstripped length of optical fiber;
    an unstripped length of the fiber that has a buffer; and
    a stripped length of the fiber that has been stripped of the buffer, the fiber passing through the cap ferrule so that the unstripped length lies in the back section and the stripped length passes through the front section, the bore of the cap ferrule in the back section being sized to accommodate the diameter of the unstripped length.

6. The fiber tail assembly according to claims 5, further comprising a spacer tube, the unstripped length passing through the spacer tube, the bore of the cap ferrule in the back section being sized to accommodate the diameter of the spacer tube, the spacer tube lying in the back section of and protruding from the back end of the cap ferrule, and the unstripped length, the spacer tube and the back section being secured together.

7. The fiber tail assembly according to claim 1, wherein the sealing ferrule is comprised of ceramic or glass.

8. The fiber tail assembly according to claim 1, wherein the ferrule seal is comprised of solder or glass.

9. The fiber tail assembly according to claim 1, wherein the fiber seal is comprised of glass.

10. The fiber tail assembly according to claim 1, wherein, wherein the optical fiber is polarization maintaining fiber.

11. The fiber tail assembly according to claim 1, wherein the cap ferrule is comprised of ceramic or glass.

12. A method of providing a fiber tail assembly for connecting an optical fiber to an optical device, the method comprising:
    stripping a length of optical fiber of its buffer layer so as to form a stripped length at a front end and an unstripped length behind;
    inserting a front end of a sealing ferrule into a back end of an outer sleeve, the sealing ferrule having an opposite back end and a substantially axial bore;
    hermetically sealing the sealing ferrule to the outer sleeve with a ferrule seal;
    inserting the stripped length of optical fiber into the bore at the back end of the sealing ferrule and advancing the fiber so that a portion of the stripped length protrudes out of the front end of the sealing ferrule and a part of the unstripped length lies in the back end of the outer sleeve;
    securing together the back end of the sealing ferrule, a portion of the stripped length, and the interior of the outer sleeve; and
    hermetically sealing the front end of the sealing ferrule directly to a portion of the stripped length protruding from the front end of the sealing ferrule; and providing a cap ferrule, the cap ferrule including front and back ends and a substantially axial bore; inserting the stripped length of optical fiber into the bore at theback end of the cap ferrule so that a front edge of the unstripped length is substantially advanced to the back end of the bore; inserting the front end of the cap ferrule into the back end of the outer sleeve so that a part of the stripped length protrudes out of the front end of the sealing ferrule and a part of the cap ferrule protrudes out of the back end of the outer sleeve; and securing together the cap ferrule and the outer sleeve.

13. The method according to claim 12, further comprising:
    inserting the optical fiber through a first stress relief tube so that the first stress relief tube covers part of the unstripped length;
    inserting the first stress relief tube into the back end of the outer sleeve so that part of the first stress relief tube protrudes out of the back end of the outer sleeve; and
    securing together the unstripped length, the first stress relief tube, and the outer sleeve.

14. The method according to claim 13, further comprising:
    inserting the optical fiber through a spacer tube so that the spacer tube covers part of the unstripped length;

inserting the spacer tube into the back end of the outer sleeve so that the spacer tube lies inside the outer sleeve between the first stress relief tube and the sealing ferrule; and securing together the unstripped length, the spacer tube, the first stress relief tube, and the outer sleeve.

15. The method according to claim 14, further comprising:

inserting the optical fiber and first stress relief tube through a second stress relief tube so that the second stress relief tube covers part of the first stress relief tube;

inserting the second stress relief tube into the back end of the outer sleeve so that part of the second stress relief tube protrudes out of the back end of the outer sleeve; and securing together the unstripped length, the spacer tube, the first stress relief tube, the second stress relief tube, and the outer sleeve.

16. The method according to claim 12, wherein the cap ferrule includes a front section with a front bore diameter and a back section with a back bore diameter, the front bore diameter being sized to provide a sliding fit to the stripped length of optical fiber, the back bore diameter being sized to accommodate insertion of a part of the unstripped length of optical fiber; and the method further comprising:

inserting the stripped length of optical fiber into the back end of the cap ferrule and advancing the fiber so that the front edge of the unstripped length is substantially advanced to the front end of the back section.

17. The method according to claim 16, further comprising:

inserting the optical fiber through a spacer tube so that a front edge of the spacer tube is substantially at the front edge of the unstripped length;

securing the unstripped length to the spacer tube; and inserting the stripped length of optical fiber into the back end of the cap ferrule and advancing the fiber so that the front edges of the unstripped length and the spacer tube are substantially advanced to the front end of the back section.

18. The method according to claim 12, wherein the sealing ferrule is comprised of ceramic or glass.

19. The method according to claim 12, wherein the ferrule seal is comprised of solder or glass.

20. The method according to claim 12, wherein the fiber seal is comprised of glass.

21. The method according to claim 12, wherein the optical fiber is polarization maintaining fiber.

22. The method according to claim 12, wherein the cap ferrule is comprised of ceramic or glass.

* * * * *